June 20, 1933.  W. J. MORRILL ET AL  1,915,069
SYNCHRONOUS INDUCTION MOTOR
Filed Sept. 29, 1931

Inventors:
Wayne J. Morrill,
William A. Pringle,
by Charles S. Fuller
Their Attorney.

Patented June 20, 1933

1,915,069

UNITED STATES PATENT OFFICE

WAYNE J. MORRILL AND WILLIAM A. PRINGLE, OF FORT WAYNE, INDIANA, ASSIGNORS TO GENERAL ELECTRIC COMPANY, A CORPORATION OF NEW YORK

SYNCHRONOUS INDUCTION MOTOR

Application filed September 29, 1931. Serial No. 565,838.

This invention relates to synchronous induction motors and more particularly to constructive features of such a motor which improve its starting and synchronous characteristics.

An object of our invention is to improve the starting of such a motor by causing it to approach true induction motor performance in starting.

Another object of our invention is to provide means whereby its hold-in torque at synchronous speed is substantially increased.

Figure 1:
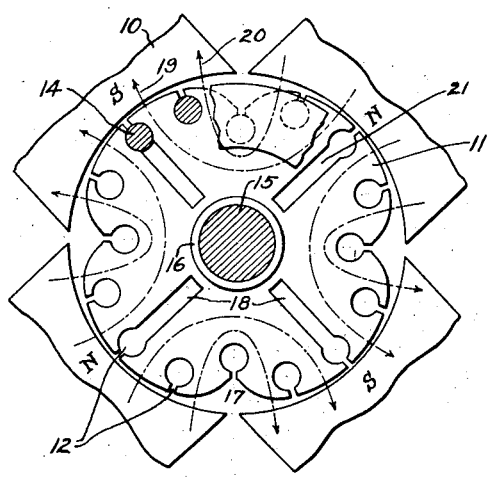
Figure 2:
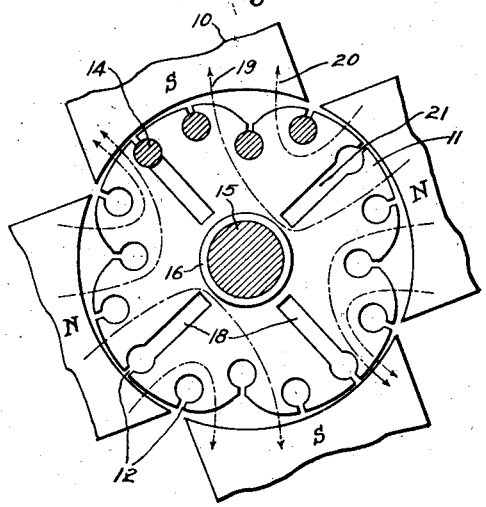
Figure 3:
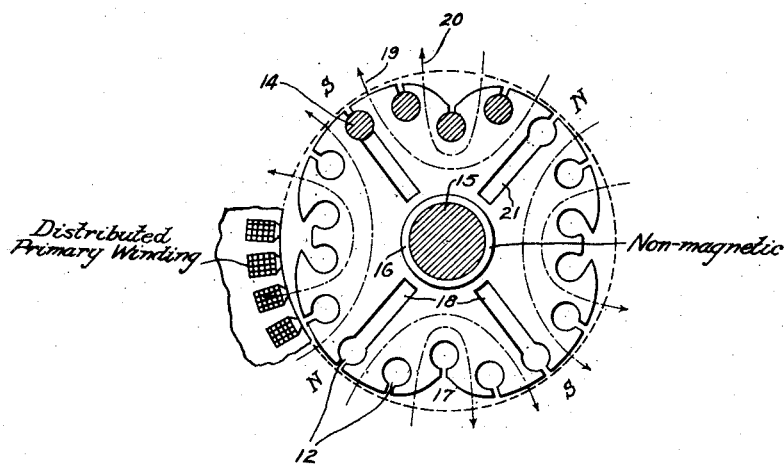

The invention will be more fully understood and further objects of the invention will appear from the following description and claims taken in connection with the accompanying drawing in which Fig. 1 shows the embodiment of our invention with the flux distribution at no load. Fig. 2 shows the embodiment of our invention with the flux distribution at full load and Fig. 3 shows a modification of the structural form shown in Figs. 1 and 2 in order to indicate that the number of slots need not be multiples of the number of field poles and to bring out that the primary winding is distributed.

It is well known to those skilled in the art that an inherent difficulty in manufacturing a motor of the synchronous induction type is the fact that such a motor must have clear-cut salients during synchronous performance and at the same time in starting should approach the characteristics of an induction motor. Our method of constructing such a motor is shown in Fig. 1 in which the primary 10 will consist of the usual type of winding distributed in peripheral slots as indicated in Fig. 3. In Figs. 1 and 2 the poles produced by such a winding are indicated rather than the winding itself in order to bring out more clearly the flux distribution between primary and secondary. The secondary is made up of laminations 11 having slots 12 in its outer periphery for the insertion of the secondary winding, here shown as squirrel cage bars 14. It should be noted that these slots are so constructed that the bars 14 are under the iron and follow the outline curve of the iron. This allows a more correct curve of the iron shape to be obtained and at the same time enables the rotor to be hydraulically riveted without distortion. The laminations in case the shaft 15 is of magnetic material, are magnetically insulated from the shaft by means of the non-magnetic bushing 16. The salient poles are produced by the smooth cut shown at 17 but it is to be understood that although we consider the smooth cut as a part of our invention, nevertheless, we intend to claim the use of deep slots 18 and 21 with any type of salient and in this regard, the cut shown is to be considered as illustrative. The deep slots shown in Figs. 1 and 2 are sufficiently wide and deep to divide the rotor into substantially four equal parts, being spaced substantially at 180 electrical degrees to each other.

It is evident that the rotor structure shown has salient poles that will hold the rotor in synchronism with the rotating magnetic field when synchronism is established. During the induction motor starting operation of the usual salient pole synchronous motor, the presence of the magnetic salients is undesirable because the conditions are such during starting that the irregularity in the distribution of the magnetic material of the secondary causes a locking tendency at standstill, or a dip in the starting torque at some subnormal speed, or both, due to various different combinations of flux harmonics and variations in air gap reluctance. Thus, the object of the present invention is to so form the salient poles of the secondary as to largely prevent these conditions from occurring during starting operation, and thus prevent locking and sub-synchronous torque conditions from detracting from the induction motor starting torque. These undesirable sub-synchronous torque conditions could, of course, be eliminated entirely by employing a rotor having uniform air gap reluctance at all points with respect to the stator fluxes. But this is impossible if we are to have stator-excited salient rotor poles for synchronous operation. However, by means of our invention we can largely prevent the formation of these sub-synchronous parasitic torques, and still have satisfactory salient poles for synchronous operation.

Stated in non-technical language, we have discovered that if we scallop out the rotor periphery in a smooth curve forming the salient poles between the scalloped out intersalients so that the pole tips are rounded off and intersect in a gentle curve at the deepest point of the intersalient, we can eliminate most of the sub-synchronous torque tendencies. Other undesirable torques may be eliminated by using a stator winding which avoids the production of certain harmonic fluxes. The salient pole effect is then preferably brought back to normal by providing deep radial slots to give them magnetic stiffness without disturbing the desired exterior shape of such poles.

The smooth curve 17 improves the starting characteristics of the motor since with such a construction it is possible to control the harmonics present in the air gap flux and to eliminate those harmonics which cause locking or crawling of the rotor. Specifically by shaping the rotor so as to make the reciprocal of the air gap follow a smooth curve, represented by the equation of the form $1/g = P_0 + P_2 \cos 2\theta$, in which $g$ represents the air gap, $P_2$ and $P_0$ the maximum deviation of permeance from the average and the average permeance respectively, and $\theta$ the electrical degrees around the periphery of the rotor, the second harmonic of permeance and no other harmonic of permeance will be introduced. Assume a sine wave of magnetomotive force revolving around the primary equal to $KI$ max. $\cos(\theta - wt)$ in which K is a constant, I max. is the maximum current and $wt$ is the angular velocity. The above equation for the air gap is equal to the permeance since the reciprocal of the air gap is equal to the permeance. If the permeance determined by this equation is acted upon by the magnetomotive force represented by the equation $KI$ max. $(\cos(\theta - wt))$, the result will be a flux equal to $(KI$ max. $\cos(\theta - wt)) \times (P_0 + P_2 \cos 2\theta)$. This equation when simplified will equal $KI$ max. $P_0 \cos(\theta - wt) + \frac{1}{2} KI$ max. $P_2 \cos(3\theta - wt) + \frac{1}{2} KI$ max. $P_2 \cos(\theta + wt)$.

The first term of this equation represents a forward revolving torque producing flux. The second term represents a third harmonic of flux and may cause locking of the rotor if the primary flux distribution is such that a harmonic is present with which this third harmonic can react. This can be guarded against by properly distributing the primary winding in such a way as to eliminate undesirable harmonics in the primary flux—in general if a winding spans only $$\frac{n-1}{n}$$

of a pole pitch, the $n$th harmonic will be eliminated. Thus locking and crawling are substantially avoided by shaping the rotor as illustrated in our invention providing the appropriate harmonics of the primary flux distribution are substantially reduced or eliminated.

As the motor reaches its synchronous speed, the current will be greatly reduced and the primary flux becomes stationary in relation to the secondary. The lines of force will tend to take the path of least reluctance and substantially all of them will avoid the relatively high reluctance path caused by the cut 17, thus giving clear cut salients for synchronous operation.

The utility of the deep slots 18 for increasing the holding torque at synchronous speeds can be appreciated by noting Figs. 1 and 2 in which the lines of force 19 and 20 are shown under no load and full load conditions respectively. It is an inherent characteristic of a line of flux that it will travel the path of least reluctance. In Fig. 1 the path of least reluctance is also the minimum reluctance path position of the rotor. In Fig. 2 the machine has been loaded, causing the rotor to lag behind the rotating field. In this case a relatively large part of the flux must pass around the slot 21, the magnetic reluctance of this path is comparatively large since the magnetic material between its lower edge and the non-magnetic bushing 16 is of small cross section and saturated by the normal rotor flux. The result of such high magnetic reluctance is that a torque will be developed which will tend to cause the rotor to assume the minimum reluctance position shown in Fig. 1. From this it is obvious that the machine can be loaded without any appreciable danger of the rotor falling out of step with the rotating field and can be loaded to a considerably greater extent than could a machine without the slots of our invention.

It should be noted that the deep slots do not become fully effective until the flux passing through the restricted area saturates the iron in these areas. If the deep slot is so proportioned as to give the flux which would give the best results in a motor having normal flux, the area between the bottom of the deep slot and the inner periphery of the rotor would either need be made very small so that this area would be saturated or else alternate laminations of the secondary can be made of non-magnetic material.

In Fig. 3 we have shown a modification in which the number of slots is not an exact multiple of the number of poles and in which the deep slots are not located 180° apart. This figure is added to indicate that the invention is not limited to the uniform structure illustrated in Figs. 1 and 2 but that the number of shallow slots and the distance between deep slots can be chosen in practice so as to give the best motor performance.

It is to be understood that our invention is not limited to single-phase motors and is not dependent on having the secondary the rotating member. The illustrations are shown in connection with a four-pole motor but it will be obvious to those skilled in the art that the invention is not limited to a motor of any definite pole number.

While we have described particular embodiments of our invention, it will be obvious to those skilled in the art that various modifications may be made without departing from the spirit of our invention and therefore we desire to cover all such modifications as fall within the scope of our invention in the appended claims.

What we claim as new and desire to secure by Letters Patent of the United States is:

1. A synchronous induction motor having a secondary of the salient pole type, the salients being in the form of a smooth curve which has only a second harmonic of permeance with reference to the fundamental number of poles, and which secondary is provided with deep slots along diameters of the secondary of a number equal to the number of salient poles, such slots being so positioned that the axis of maximum reluctance of the secondary is at substantially 90 electrical degrees to the axis of the slots.

2. A synchronous induction motor comprising relatively rotatable primary and secondary members, the secondary being entirely excited by the primary and consisting of salient poles of magnetic material, said poles being so shaped that the reciprocal of the air gap between said primary and secondary substantially follows a curve represented by $P_0 + P_2 \cos 2\theta$ in which $\theta$ equals the electrical degrees around the periphery of the rotor, $P_2$ equals the maximum deviation of permeance from the average, and $P_0$ equals the average permeance.

3. A synchronous induction motor comprising a primary, a secondary excited by said primary, said secondary comprising a core of magnetic material forming salient poles, the leading and trailing pole tips of which are rounded, and deep slots of a number equal to the number of salient poles located substantially in the center of said salient poles.

4. A synchronous induction motor having a secondary provided with salient poles of magnetic material, the leading and trailing pole tips of which are rounded, said secondary, including a shaft to which by means of a non-magnetic sleeve the core comprised of laminations is attached, said laminations being so arranged as to form deep slots located substantially in the center of said salient poles, the depth of which slots is sufficient to allow the portion of the core between the bottom of said slots and the inner circumference of said core to be saturated by the normal rotor flux.

5. A synchronous induction motor comprising a primary, a secondary excited thereby which is formed of magnetic laminations so arranged that there are deep slots forming barriers for the magnetic flux at substantially 90 electrical degrees to the axis of maximum reluctance of said secondary, and providing for the division of said secondary into salient poles, the leading and trailing pole tips of which are rounded.

6. A secondary member for a synchronous induction motor comprising a cylindrical member of magnetic material with relatively shallow, substantially evenly spaced, scalloped out intersalients in its periphery forming salient poles between such intersalients, such that adjacent leading and trailing pole tips are rounded off and intersect at the deepest point of the intersalient, and a squirrel cage winding having bars located in slots in the peripheral portion of said secondary.

7. A secondary member for synchronous machines comprising a cylindrical magnetic member having evenly spaced, scalloped out intersalients in its periphery forming salient poles between such intersalients, and having deep slots at the centers of the salient poles thus formed comprising barriers for the magnetic flux between the leading and trailing halves of such salient poles.

8. A synchronous induction motor comprising relatively rotatable primary and secondary members, the secondary being entirely excited by the primary and consisting of salient poles of magnetic material which poles are so shaped that the reciprocal of the air gap follows a curve represented by $P_0 + P_2 \cos 2\theta$ in which $\theta$ equals electrical degrees around the periphery of the rotor, $P_0$ equals the average permeance and $P_2$ equals the maximum deviation from the average and the winding on the primary being so arranged as to eliminate the third harmonic from the primary flux distribution.

9. A synchronous induction motor comprising a wound primary and a secondary, the periphery of said secondary being constructed in the form of a smooth curve which has only a second harmonic of permeance with reference to the fundamental number of poles and said primary having its winding so arranged that there will be no harmonics present in the primary flux distribution which will react with the third harmonic of the flux produced by a sine wave of magnetomotive force revolving around the primary acting on said second harmonic of permeance.

In witness whereof, we have hereunto set our hands.

WAYNE J. MORRILL.
WILLIAM A. PRINGLE.